(12) United States Patent  
Yoshida

(10) Patent No.: US 10,891,772 B2  
(45) Date of Patent: Jan. 12, 2021

(54) RENDERING APPARATUS, RENDERING METHOD AND RECORDING MEDIUM

(71) Applicant: NEC Corporation, Tokyo (JP)

(72) Inventor: Arihiro Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 15/454,673

(22) Filed: Mar. 9, 2017

(65) Prior Publication Data

US 2017/0263042 A1 Sep. 14, 2017

(30) Foreign Application Priority Data

Mar. 9, 2016 (JP) .................................. 2016-045143

(51) Int. Cl.
*G06T 15/00* (2011.01)
*G06T 17/10* (2006.01)
*G06T 15/06* (2011.01)

(52) U.S. Cl.
CPC ............ *G06T 15/005* (2013.01); *G06T 15/06* (2013.01); *G06T 17/10* (2013.01)

(58) Field of Classification Search
CPC .............................. G06T 15/005; G06T 15/06
See application file for complete search history.

(56) References Cited

U.S. PATENT DOCUMENTS

| | | | |
|---|---|---|---|
| 5,734,385 A | 3/1998 | Mima | |
| 5,936,633 A | 8/1999 | Aono et al. | |
| 9,082,230 B2 | 7/2015 | Gautron et al. | |
| 2005/0088440 A1* | 4/2005 | Sloan | G06T 15/55 345/426 |
| 2010/0315423 A1 | 12/2010 | Ahn et al. | |
| 2013/0063460 A1* | 3/2013 | Marison | G06T 15/005 345/582 |

(Continued)

FOREIGN PATENT DOCUMENTS

| | | |
|---|---|---|
| JP | 07-262405 | 10/1995 |
| JP | 08-221594 | 8/1996 |

(Continued)

OTHER PUBLICATIONS

Goral et al., "Modeling the Interaction of Light Between Diffuse Surfaces", ACM SIGGRAPH Computer Graphics, ACM Jul. 1984, vol. 18, No. 3, pp. 213-222.

(Continued)

*Primary Examiner* — Barry Drennan
*Assistant Examiner* — Khoa Vu
(74) *Attorney, Agent, or Firm* — Sughrue Mion, PLLC

(57) ABSTRACT

A rendering apparatus includes: a fragmentation unit configured to divide a three-dimensional model into a plurality of fragments; a calculation unit configured to calculate first radiance for each of the plurality of fragments, the first radiance being radiance in a direction from each of the plurality of fragments to every other of the plurality of fragments; and a rendering unit configured to calculate second radiance for each fragment visible from a viewpoint among the plurality of fragments based on the first radiance, the second radiance being radiance in a direction from the fragment to the viewpoint, project each fragment visible having the second radiance on a rendering screen relevant to the viewpoint, and generate a rendered image.

13 Claims, 13 Drawing Sheets

(56) References Cited

U.S. PATENT DOCUMENTS

| | | | | |
|---|---|---|---|---|
| 2013/0176313 A1* | 7/2013 | Gautron | ............... | G06T 15/50 345/426 |
| 2013/0321416 A1* | 12/2013 | Marvie | ............... | G06T 1/60 345/420 |
| 2014/0292757 A1* | 10/2014 | Tokuyoshi | ............... | G06T 15/06 345/426 |
| 2014/0313198 A1 | 10/2014 | Keller et al. | | |
| 2015/0348314 A1 | 12/2015 | Koguchi et al. | | |
| 2016/0171753 A1* | 6/2016 | Park | ............... | G06T 15/50 345/420 |
| 2017/0116773 A1* | 4/2017 | Iwaniec | ............... | G06T 15/06 |

FOREIGN PATENT DOCUMENTS

| | | |
|---|---|---|
| JP | 10-79045 | 3/1998 |
| JP | 2005-332315 | 12/2005 |
| JP | 2007-026036 | 2/2007 |
| JP | 2009-163610 | 7/2009 |
| JP | 2010-044738 | 2/2010 |
| JP | 2010-287235 | 12/2010 |
| JP | 2012-089121 | 5/2012 |
| JP | 2015-228186 | 12/2015 |

OTHER PUBLICATIONS

Cook et al., "Distributed Ray Tracing", ACM SIGGRAPH Computer Graphics, ACM, Jul. 1984, vol. 18, No. 3, pp. 137-145.

Kajiya, "The Rendering Equation", ACM SIGGRAPH Computer Graphics, ACM, Aug. 1986, vol. 20, No. 4, pp. 143-150.

Japanese Office Action dated Feb. 7, 2017 in corresponding Japanese Application No. 2016-045143.

Japanese Official Action—2016-045143—dated May 9, 2017.

* cited by examiner

Fig.3
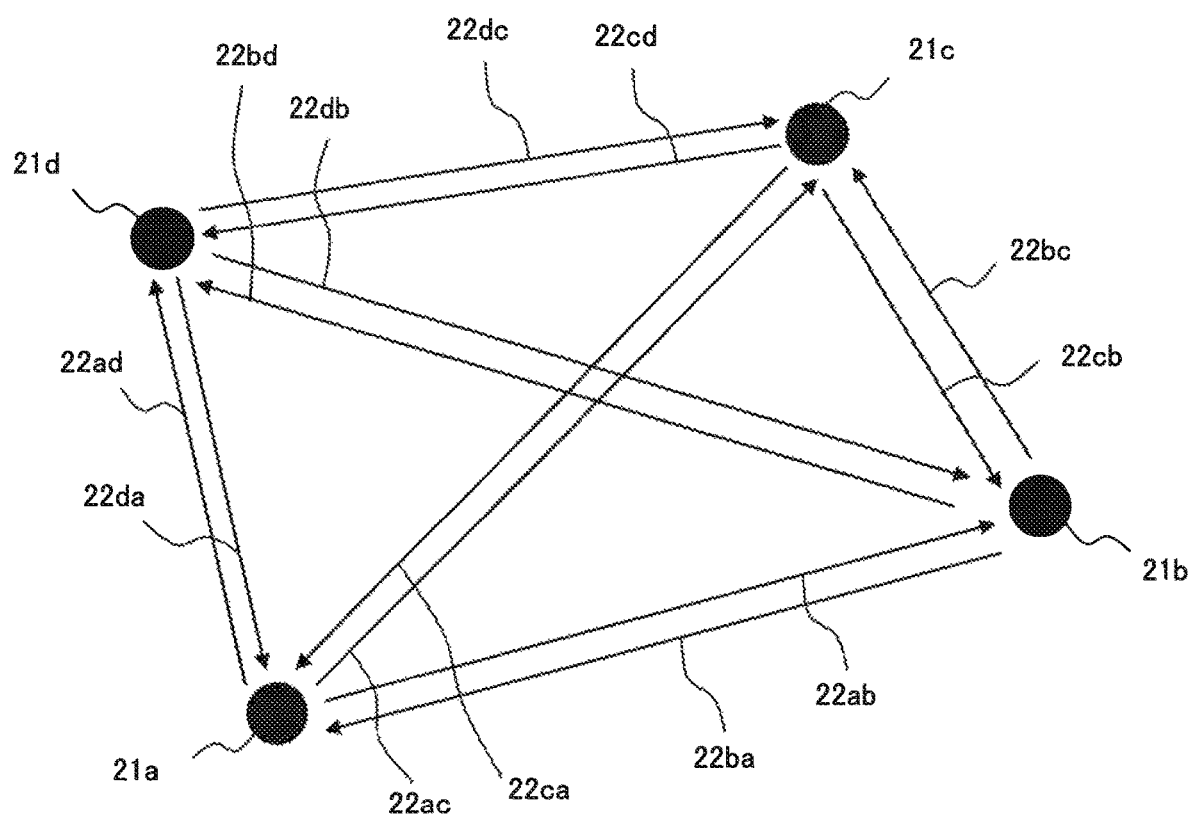
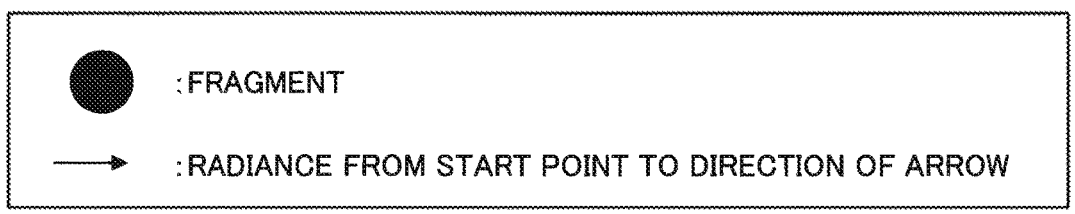

Fig.6

```
1: while RADIANCE DOES NOT CONVERGED {
2:   for each FIRST RADIANCE I {
3:     a = RADIANCE FROM FRAGMENT BEING START POINT OF ARROW RELEVANT TO I TO DIRECTION OF ARROW
4:     for each RADIANCE J INCIDENT ON FRAGMENT BEING START POINT OF ARROW RELEVANT TO I {
5:       a = a + J * (REFLECTANCE FROM DIRECTION OF ARROW RELEVANT TO J TO DIRECTION OF ARROW RELEVANT TO I)
6:     }
7:     I = a
8:   }
9: }
```

Fig.7

| FRAGMENT OF START POINT | FRAGMENT OF END POINT | FIRST RADIANCE ($W/sr/m^2$) |
|---|---|---|
| 21a | 21b | xxxxx |
| 21a | 21c | xxxxy |
| 21a | 21d | xxxxz |
| 21b | 21a | yyyya |
| 21b | 21c | yyyyc |
| ⋮ | ⋮ | ⋮ |

Fig.9

```
1: for each VISIBLE FRAGMENT {
2:    a = SECOND RADIANCE IN DIRECTION FROM FRAGMENT TO VIEWPOINT
3:    for each RADIANCE J INCIDENT ON FRAGMENT {
4:       a = a + J * (REFLECTANCE FROM DIRECTION OF ARROW RELEVANT TO J TO DIRECTION OF VIEWPOINT)
5:    }
6:    RENDER FRAGMENT AT PROJECTION POSITION ON RENDERING SCREEN WITH COLOR ASSOCIATED WITH SECOND RADIANCE a
7: }
```

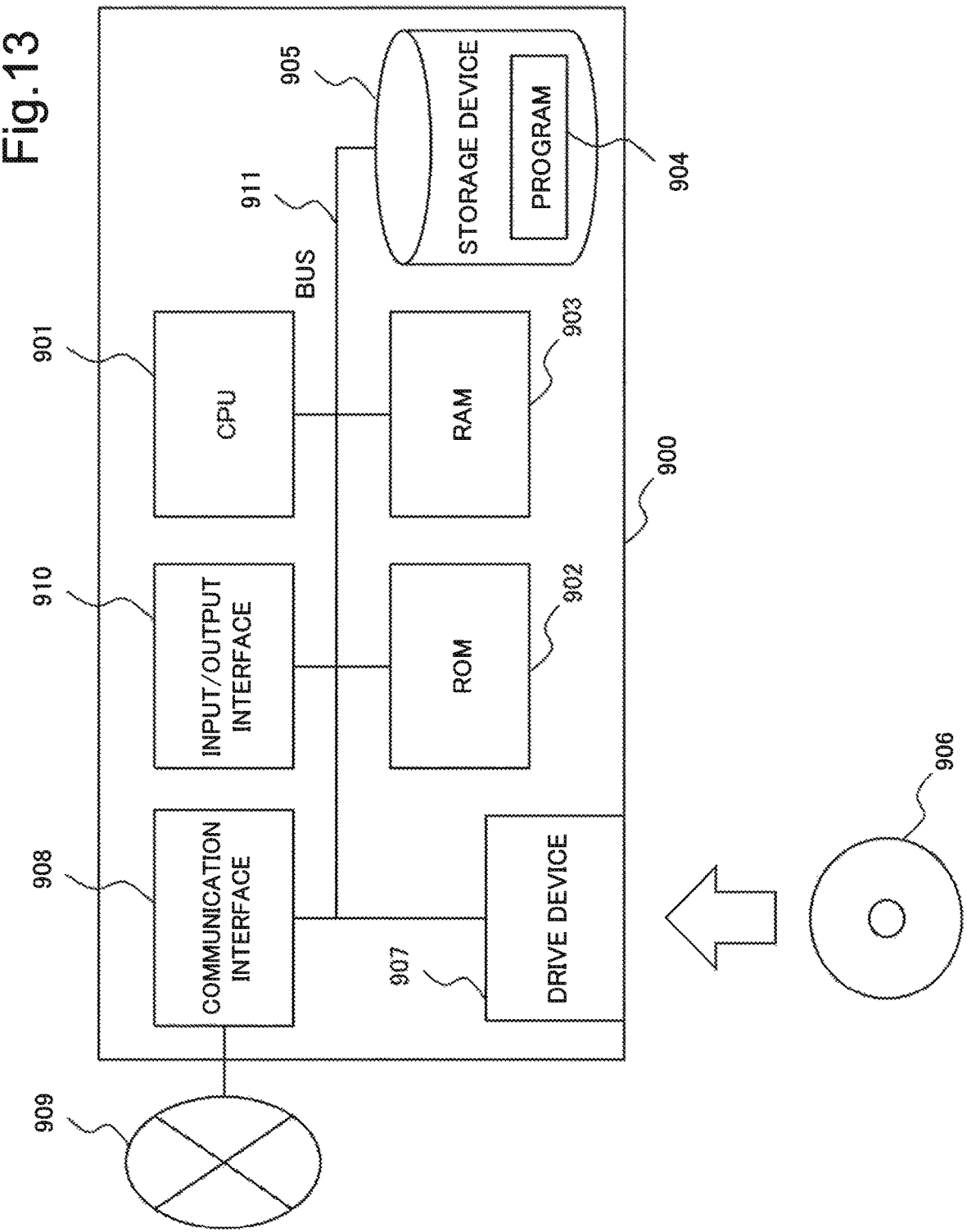

RENDERING APPARATUS, RENDERING METHOD AND RECORDING MEDIUM

This application is based upon and claims the benefit of priority from Japanese Patent Application No. 2016-045143, filed on Mar. 9, 2016, the disclosure of which is incorporated herein in its entirety by reference.

TECHNICAL FIELD

The present disclosure relates to a rendering apparatus of global illumination graphics, a rendering method of the same and recording medium of the same.

BACKGROUND ART

In rendering of global illumination graphics, there has been proposed a method called "radiosity" which enables to simulate indirect illumination with a relatively small processing amount compared to other methods, by calculating radiance of ray between a plurality of diffused surfaces under a condition that reflected light of a diffused surface becomes incident light of another diffused surface (NPL1: Cindy M. Goral, Kenneth E. Torrance, Donald P. Greenberg, Bennett Battaile, "Modeling the Interaction of Light Between Diffuse Surfaces", ACM SIGGRAPH Computer Graphics, ACM, July 1984, Volume 18, Number 3, pp. 213-222).

While a rendered image of three-dimensional graphics is that formed by light entering a viewpoint, a method of enabling to simulate reflection and refraction by reversely tracing a ray from the viewpoint is referred to as "ray tracing". The ray tracing has an issue of incapability of realistically handling diffuse reflection and the like, and a method called "distributed ray tracing" has been proposed as that for solving the issue (NPL2: Robert L. Cook, Thomas Porter, Loren Carpenter, "Distributed Ray Tracing", ACM SIGGRAPH Computer Graphics, ACM, July 1984, Volume 18, Number 3, pp. 137-145).

Further, to solve an issue that a processing amount of the distributed ray tracing increases exponentially with increasing the number of diffuse reflections, there has been proposed a method called "path tracing" which reduces the processing amount by performing random selection of one reflection direction and averaging of results obtained by repeating many times the random selection (NPL3: James T. Kajiya, "THE RENDERING EQUATION" ACM SIGGRAPH Computer Graphics, ACM, August 1986, Volume 20, Number 4, pp. 143-150).

Japanese Patent Application Laid-open Publication No. 2010-44738 discloses an illumination simulator using the radiosity method.

SUMMARY

An example of an objective of the present disclosure is to provide a rendering apparatus, a rendering method and a recording medium, which are highly versatile and enable efficiently generation of highly precise rendered image.

A rendering apparatus according to one aspect of the present disclosure includes: a fragmentation unit configured to divide a three-dimensional model into a plurality of fragments; a calculation unit configured to calculate first radiance for each of the plurality of fragments, the first radiance being radiance in a direction from each of the plurality of fragments to every other of the plurality of fragments; and a rendering unit configured to calculate second radiance for each fragment visible from a viewpoint among the plurality of fragments based on the first radiance, the second radiance being radiance in a direction from the fragment to the viewpoint, project each fragment visible having the second radiance on a rendering screen relevant to the viewpoint, and generate a rendered image.

A rendering method according to one aspect of the present disclosure includes: dividing a three-dimensional model into a plurality of fragments; calculating first radiance for each of the plurality of fragments, the first radiance being radiance in a direction from each of the plurality of fragments to every other of the plurality of fragments; and calculating second radiance for each fragment visible from a viewpoint among the plurality of fragments based on the first radiance, the second radiance being radiance in a direction from the fragment to the viewpoint, projecting each fragment visible having the second radiance on a rendering screen relevant to the viewpoint, and generating a rendered image.

The present disclosure also includes a computer program for causing a computer to implement the rendering apparatus, or the rendering method, and a non-transitory computer-readable storage medium on which the computer program is stored.

BRIEF DESCRIPTION OF THE DRAWINGS

Exemplary features and advantages of the present disclosure will become apparent from the following detailed description when taken with the accompanying drawings in which:

FIG. 3 is a diagram for illustrating a fragment graph representing a relationship of a plurality of fragments with radiance;

FIG. 6 is a diagram illustrating an example of a case where an operation of calculation of the first radiance is indicated by pseudo code;

FIG. 7 is a diagram illustrating an example of the first radiance calculated by a calculation unit;

FIG. 9 is a diagram illustrating an example of a case where an operation of a rendering process performed by the rendering unit is indicated by pseudo code;

FIG. 13 is a diagram illustrating an example of a hardware configuration of a computer (information processing device) capable of realizing each example embodiment of the present disclosure.

EXAMPLE EMBODIMENT

First Example Embodiment

Figure 1:
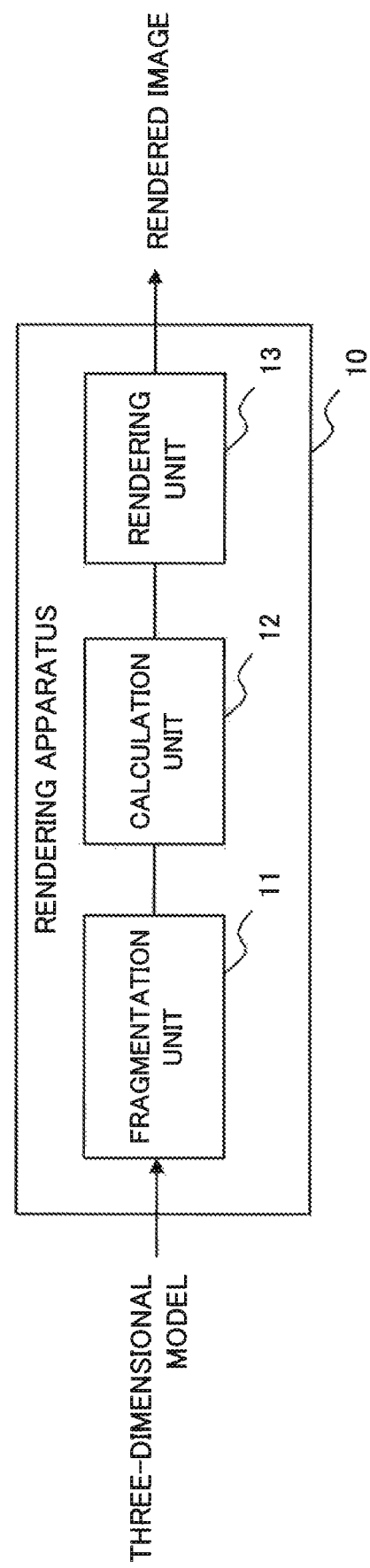
FIG. 1 is a functional block diagram illustrating an example of a functional configuration of a rendering apparatus according to a first example embodiment.

A first example embodiment of the present disclosure will be described in detail, with reference to drawings. FIG. 1 is a functional block diagram illustrating an example of a functional configuration of a rendering apparatus 10 according to the present example embodiment. The rendering apparatus 10 includes a fragmentation unit 11, a calculation unit 12 and a rendering unit 13.

The fragmentation unit 11 divides a three-dimensional model into a plurality of fragments. The fragmentation unit 11 provides the result of fragmentation for the calculation unit 12.

The calculation unit 12 receives the result of fragmentation from the fragmentation unit 11. The calculation unit 12 calculates first radiance which is radiance in a direction from each of the plurality of fragments to other fragments. The calculation unit 12 calculates, in each of the plurality of fragments, the first radiance for each of the other fragments. The calculation unit 12 provides the calculated first radiance for the rendering unit 13.

The rendering unit 13 receives the first radiance from the calculation unit 12. The rendering unit 13 calculates, based on the received first radiance, second radiance for each fragment visible from a given viewpoint among the plurality of fragments, the second radiance being radiance in the direction from the fragment to the viewpoint. The rendering unit 13 projects each fragment visible having the second radiance on a rendering screen relevant to the viewpoint, and generates a rendered image.

In this way, the rendering apparatus 10 according to the present example embodiment can efficiently generate a highly precise rendered image and has high versatility. Hereinafter, operation of each of the units will be described in detail.

The fragmentation unit 11 receives a three-dimensional model as input and, by dividing the three-dimensional model into fragments, generates a plurality of fragments. Hereafter, the operation of dividing into fragments is referred to as fragmentation or a fragmentation process. Here, the fragment means a patch (a small flat surface, a small curved surface and the like), a point (a dot, small sphere and the like), a cell (a cube, a rectangular parallelepiped and the like such as grid and octree), and may have any kind of shape. A shape of the fragment may also be a combination of these ones.

Further, there is no particular restriction on a generation method of fragments (a method of dividing into fragments) by the fragmentation unit 11, and a general scheme such as a method based on recursive curved surface division and that based on spatial division by a grid or octree may also be used.

Further, the fragmentation unit 11 may adjust the fragment size (fineness) in accordance with, for example, the quality of a rendered image such as the resolution. For example, the fragmentation unit 11 may set the fragment size to be smaller when the resolution of a rendered image rendered by the rendering unit 13 is higher than a predetermined threshold value. As a result, the rendering apparatus 10 can output a highly precise rendered image.

Figure 2:
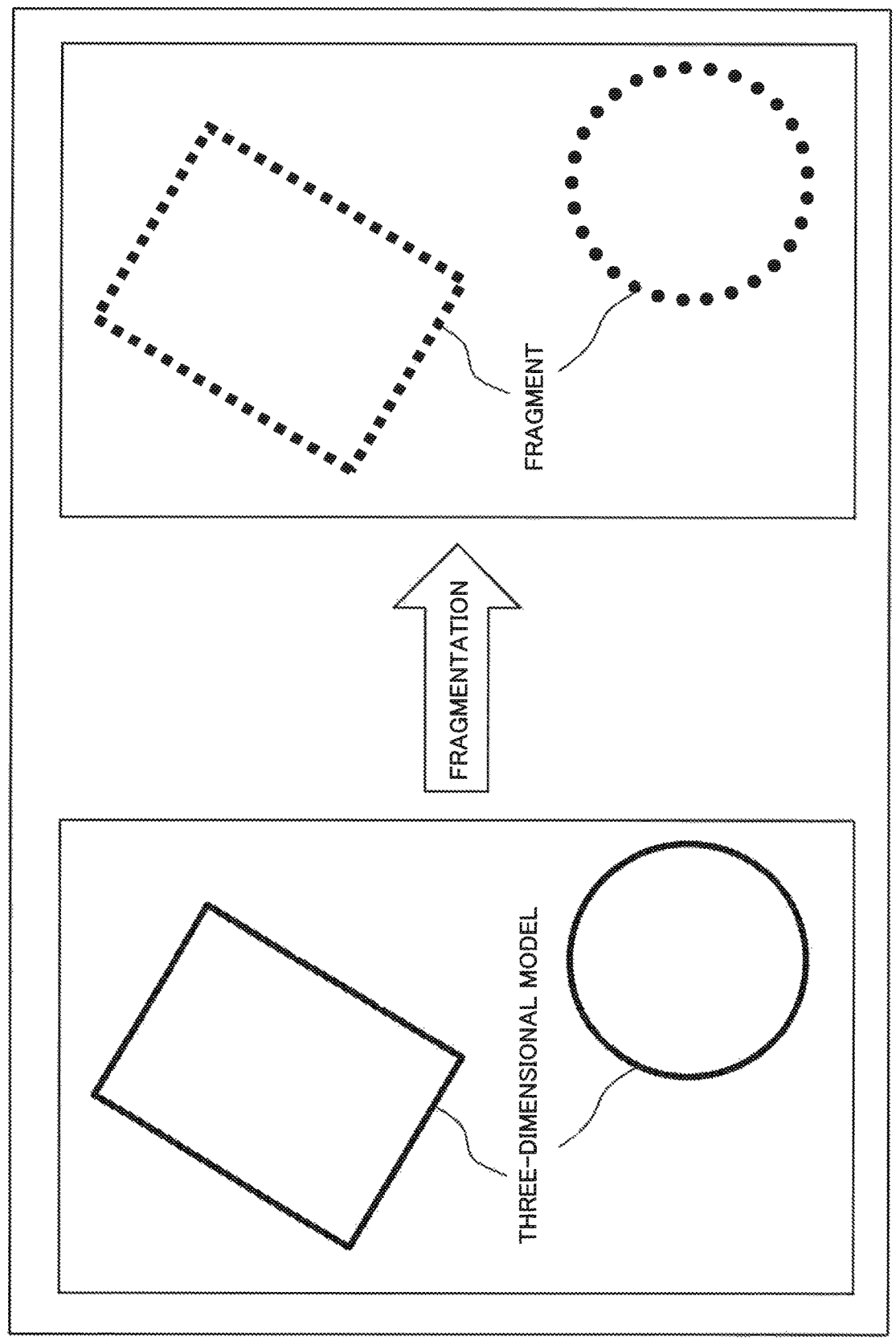
FIG. 2 is a diagram illustrating an example of a case where a fragmentation unit fragments a three-dimensional model.

FIG. 2 is a diagram illustrating an example of fragmentation of the three-dimensional model performed by the fragmentation unit 11. In FIG. 2, circular and rectangular three-dimensional models are illustrated as example. For example, the fragmentation unit 11 divides a three-dimensional model into N fragments (N is a natural number larger than 1). Then, the fragmentation unit 11 generates a fragment graph representing a relationship between a plurality of fragments generated and radiance. The fragment graph will be described below with reference to FIG. 3. As illustrated in FIG. 3, the fragment graph has fragments as vertices and the radiance in the direction from one fragment to another fragment as an edge.

In FIG. 3, four fragments (21a to 21d) are illustrated as vertices and, for each of the fragments, radiance from the fragment to the other fragments are each illustrated as an arrow. In FIG. 3, for example, the radiance 22ab represents the radiance in the direction from the fragment 21a to the fragment 21b. That is, each arrow expresses the radiance directing from the origin (start point) of the arrow to the destination (end point) of the arrow.

The fragmentation unit 11 generates the fragment graph using the plurality of fragments illustrated in FIG. 2 and provides the generated fragment graph for the calculation unit 12. While, in the present example embodiment, descriptions will be given assuming that a component for generating the fragment graph is the fragmentation unit 11, the calculation unit 12 may generate the fragment graph by receiving the plurality of fragments from the fragmentation unit 11.

The calculation unit 12 receives the fragment graph from the fragmentation unit 11. Then, the calculation unit 12 performs a calculation process for calculating the first radiance, which is the radiance in the direction from a fragment to another fragment. As illustrated in FIG. 2, the fragmentation unit 11 divides a three-dimensional model considered to consist of an infinite number of continuous points into a finite number of fragments. Thereby, the rendering apparatus 10 can reduce the calculation amount of the first radiance to an amount the calculation unit 12 can deal with. As a result, the rendering apparatus 10 can solve the issue of exponential increase in the processing amount for rendering. For example, when the fragmentation unit 11 divides the three-dimensional model into N fragments as described above, the calculation unit 12 may calculate the first radiance of the number of $N \times (N-1)$ at most. In practice, it is often the case that a fragment exists between other fragments, where a large number of rays are accordingly blocked. As a result, the number of the first radiance actually calculated by the calculation unit 12 becomes smaller than $N \times (N-1)$.

Figure 4:
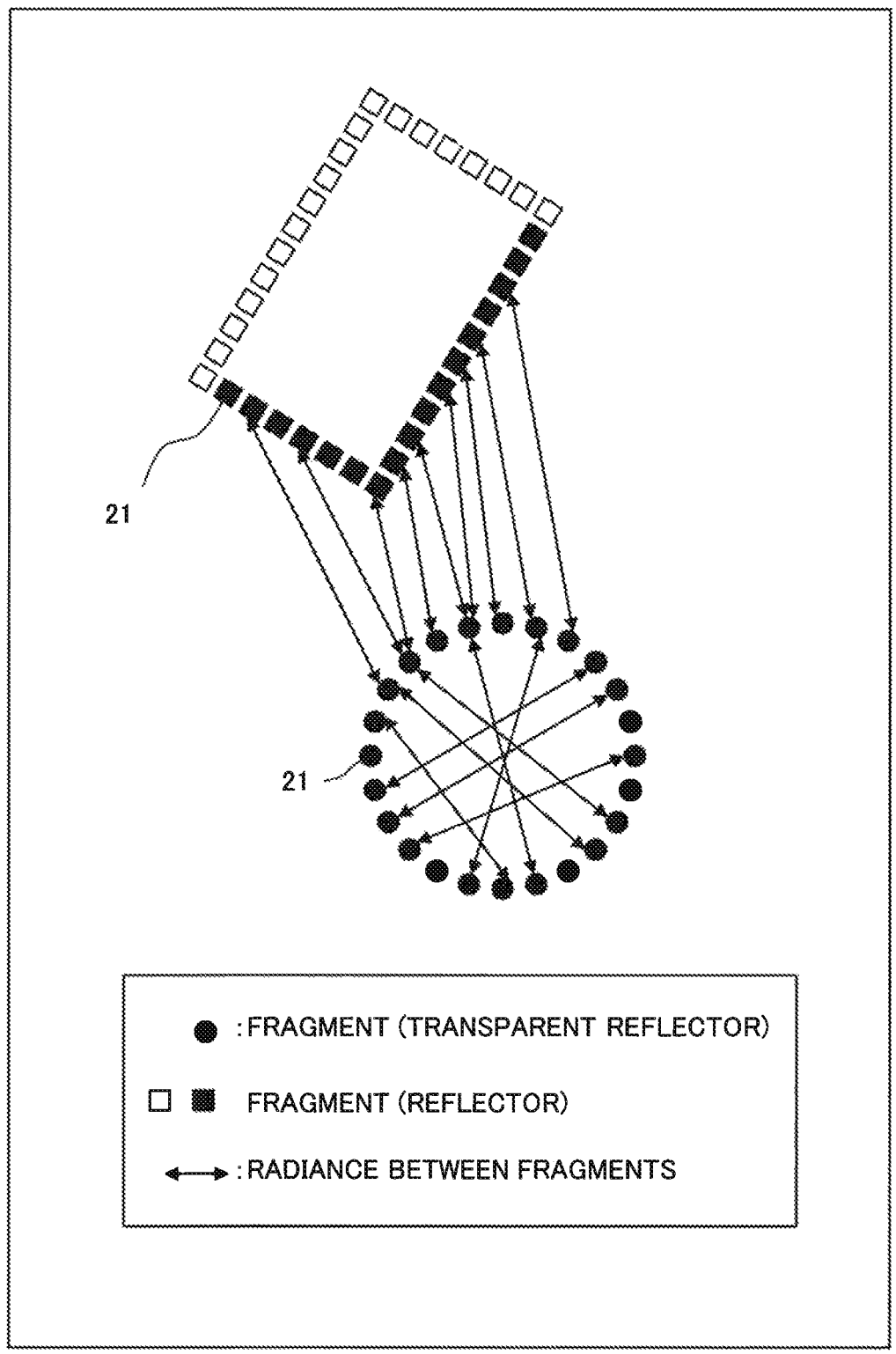
FIG. 4 is a diagram for illustrating radiance between fragments.

Next, with reference to FIGS. 4 and 5, operation of the calculation unit 12 will be described. FIG. 4 is a diagram for illustrating radiance between fragments.

Rectangular fragments illustrated in FIG. 4 represent those obtained by dividing the rectangular three-dimensional model illustrated in FIG. 2, and circular fragments in FIG. 4 represent those obtained by dividing the circular three-dimensional model in FIG. 2. Here, it is assumed that the rectangular three-dimensional model represents an opaque object and the circular three-dimensional model represents a transparent object. In that case, the rectangular fragments each may be a reflector and the circular fragments each may be a transparent reflector.

Accordingly, the calculation unit 12 calculates the first radiance in a direction from each of the reflectors to respective ones of the circular fragments, the reflector (black-painted rectangular fragment, in FIG. 4) being capable of injecting a ray to the circular three-dimensional model. Similarly, the calculation unit 12 also calculates the first radiance in a direction from each of the circular fragments to respective ones of the black-painted rectangular fragments. Further, because the circular fragments are transparent reflectors, the calculation unit 12 calculates the first radiance in a direction from one circular fragment to another circular fragment. In FIG. 4, the first radiance in the direction from one fragment to another fragment and the first radiance in the direction from the another fragment to the one fragment are represented together by one bidirectional arrow, the radiance indicated by the bidirectional arrow is referred to as the radiance between the two fragments. Here, in FIG. 4, only some number of bidirectional arrows are illustrated, for convenience of illustration.

As described above, reflectors capable of injecting rays to the circular three-dimensional model are the black-painted rectangular fragments, among all the rectangular fragment, and the white-painted rectangular fragments inject no ray to the circular three-dimensional model. Further, none of the rectangular fragments is transparent and accordingly injects any ray to the other rectangular fragments. Accordingly, as described above, the number of the first radiance to be actually calculated by the calculation unit 12 becomes smaller than $N \times (N-1)$.

The calculation unit 12 receives a fragment graph illustrated using arrows, such as that illustrated in FIG. 4, from the fragmentation unit 11 and, based on the fragment graph, calculates the first radiance.

Figure 5:
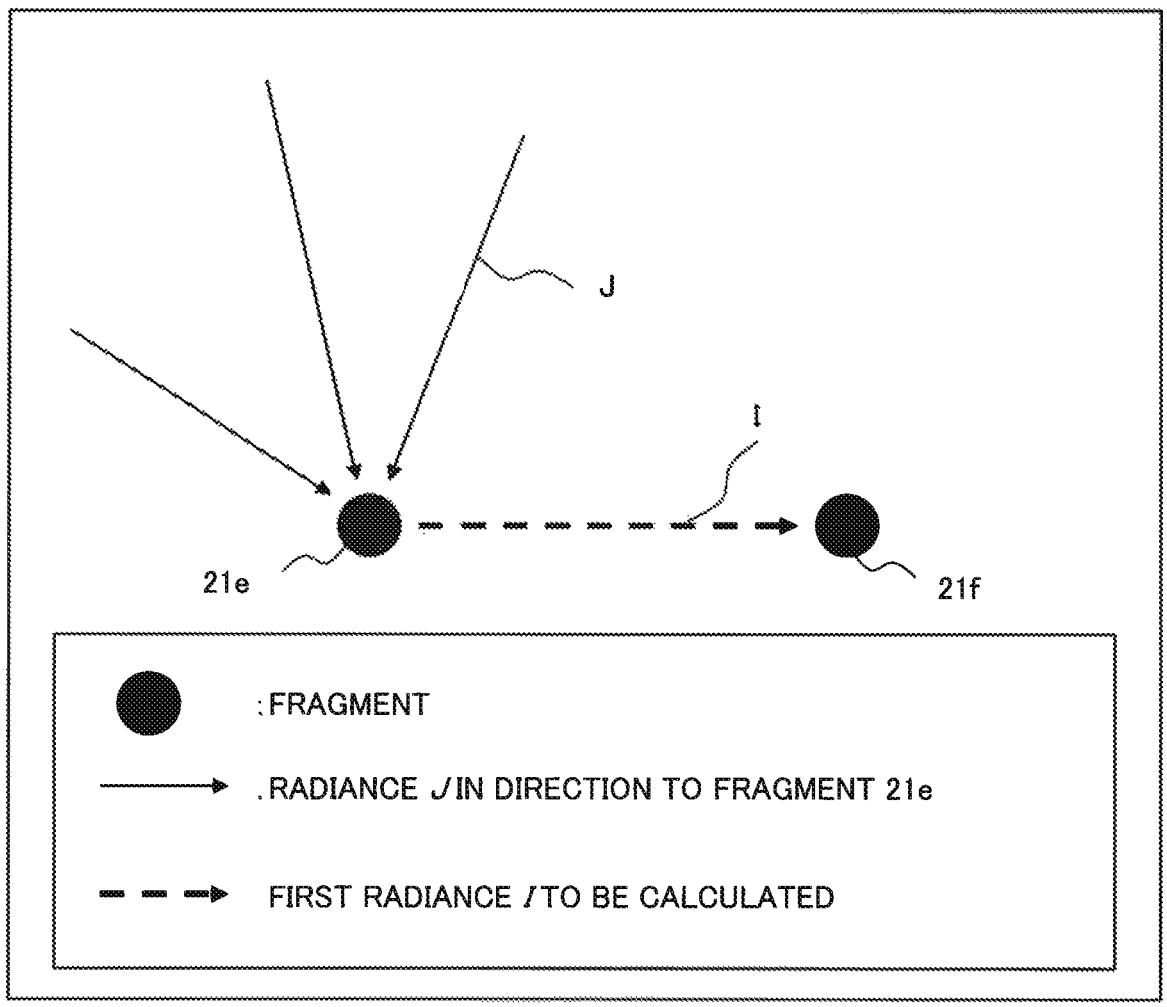
FIG. 5 is a diagram illustrating a relationship of radiance incident on a fragment with first radiance for another fragment from the fragment.

FIG. 5 is a diagram illustrating a relationship between radiance incident on a fragment and the first radiance from the fragment to another fragment and is the diagram schematically illustrating a calculation method of the first radiance by the calculation unit 12. In FIG. 5, the first radiance I calculated by the calculation unit 12 is represented by a dashed arrow. It is assumed that, in FIG. 5, the calculation unit 12 calculates the first radiance I in a direction from a fragment 21e to a fragment 21f. The first radiance I calculated by the calculation unit 12 is determined by all radiance J incident on the fragment 21e to be the starting point of an arrow relevant to the first radiance I (the dashed arrow, in FIG. 5) and by radiance of the fragment 21e. This relationship is in cyclic dependency and each relation is a linear equation, and accordingly, this relationship is represented by simultaneous linear equations. By solving the simultaneous linear equations, the calculation unit 12 calculates, for each of the fragments, the first radiance from the fragment to respective ones of the other fragments of the plurality of fragments.

Specifically, the calculation unit 12 generates simultaneous linear equations from the fragment graph and, by solving the simultaneous linear equations, calculates the first radiance, for each of the plurality of fragments, from each of the fragments to every other of the fragments.

FIG. 6 is a diagram illustrating an example of operation in the calculation of the first radiance described in pseudo code. In FIG. 6, numbers given at the most left side each indicates the line number. While the calculation unit 12 performs solution of the simultaneous linear equations as described above, it is assumed in FIG. 6, for simplicity, that the calculation unit 12 uses a relaxation method for the solution. Here, it is just an example of a solution method used by the calculation unit 12, and a solution method applicable to the calculation unit 12 is not limited to that one.

In FIG. 6, lines 3 to 7 represent relation equations for the first radiance. Each first radiance I is the sum of (1) and (2) described below. They are described below using FIG. 5.

(1) Radiance of the fragment 21e in the direction of the dashed arrow (the direction from the fragment 21e to the fragment 21f), the direction of the dashed arrow relevant to the first radiance I, the fragment 21e being a starting point of the dashed arrow.

(2) A product each obtained by multiplying each radiance J by its reflectance, the radiance J being one of all radiance J incident on the fragment 21e from the directions of the solid arrows, the reflectance being for the corresponding radiance J incident on the fragment 21e and being reflected to the direction of the dashed arrow, the fragment 21e being a starting point of the dashed arrow.

The reflectance may be that calculated from a parameter for the reflectance calculation or data on quality of material stored in a storage unit or the like not illustrated here.

In a loop of lines 2 to 8, the calculation unit 12 performs the calculation for each and every first radiance. In a loop of lines 1 to 9, the calculation unit 12 repeats the calculation and performs convergence determination by the difference between the current and last results, and ends the process at a time of convergence.

The calculation of the first radiance by the calculation unit 12 requires no scheme using random numbers such as random selection, but is performed by a deterministic procedure. As a result, the rendering apparatus 10 according to the present example embodiment can suppress noise generation in an image caused by random selection.

Then, the calculation unit 12 provides the calculated first radiance for the rendering unit 13. FIG. 7 illustrates an example of the first radiance which the calculation unit 12 has calculated and provided for the rendering unit 13. As illustrated in FIG. 7, the first radiance I calculated by the calculation unit 12 is associated with an identifier representing the fragment to be the start point of an arrow corresponding to the first radiance I (the dashed arrow in FIG. 5) and an identifier representing the fragment in the direction of the arrow (the fragment to be the end point of the arrow). Here, the fragments may be represented by three-dimensional coordinates, instead of the identifiers.

The rendering unit 13 receives the first radiance such as those illustrated in FIG. 7 from the calculation unit 12. On the basis of the received first radiance, the rendering unit 13 calculates, for each fragment visible from the viewpoint among the plurality of fragments relevant to the first radiance, the second radiance which is radiance in the direction of the fragment to the viewpoint. Here, a fragment visible from the viewpoint means a fragment which is present within the sight from the viewpoint and not obscured by another fragment in front of the fragment visible from the viewpoint (a fragment present on the side of the viewpoint).

Figure 8:
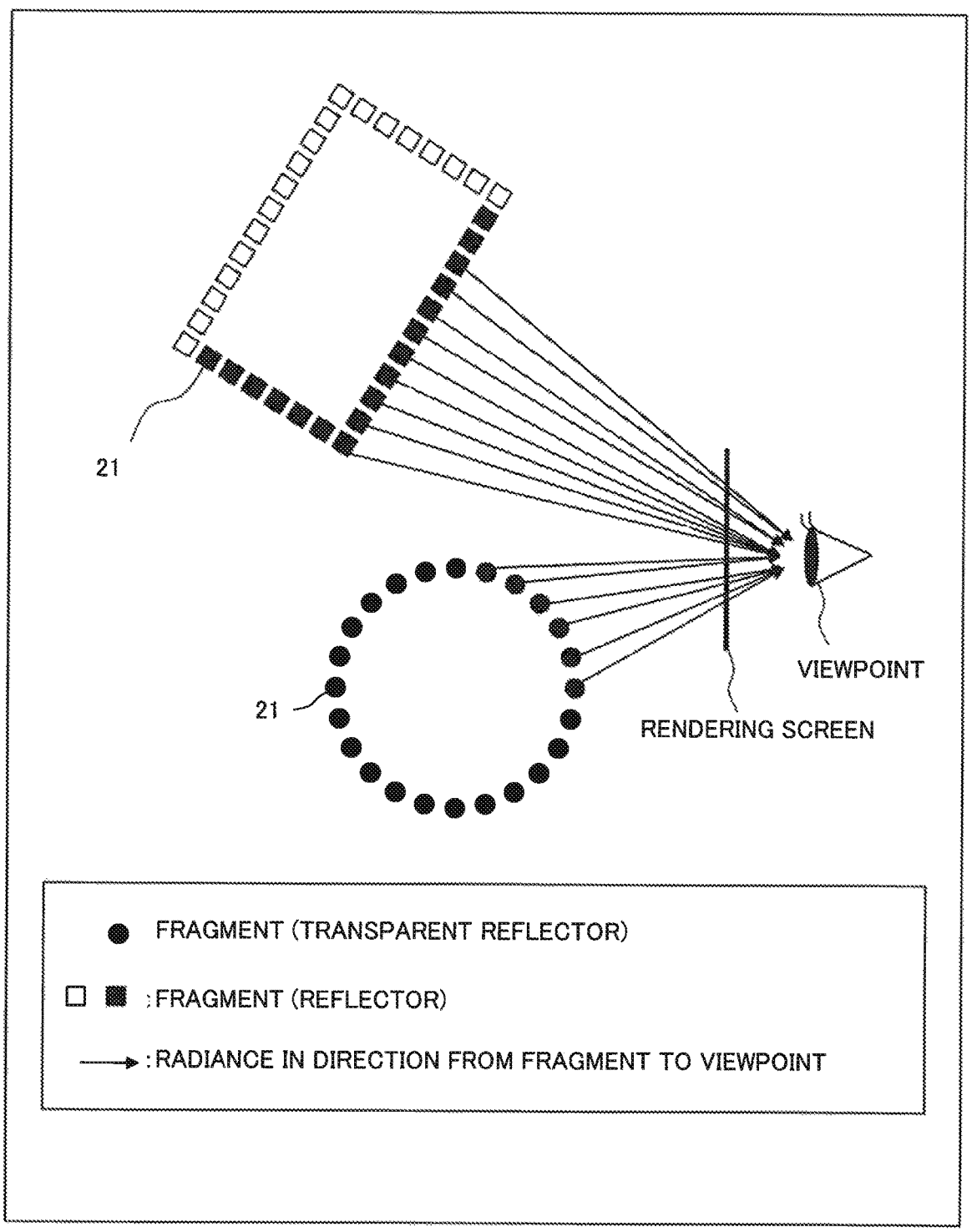
FIG. 8 is a diagram for illustrating an operation of a rendering unit.

FIG. 8 is a diagram for explaining operation of the rendering unit 13. In FIG. 8, solid arrows each represent the radiance in a direction from the fragment to the viewpoint. It is assumed that, among fragments illustrated in FIG. 8, only those each being the start point of one of the arrows are fragments visible from the viewpoint. For each of the fragments visible from the viewpoint, the rendering unit 13 calculates the second radiance using the same method as the calculation method of the first radiance described using FIG. 6.

Then, the rendering unit 13 projects the fragments visible from the viewpoint on a rendering screen relevant to the viewpoint. At that time, the rendering unit 13 projects each of the fragments such that the fragment has the second radiance calculated for it. Specifically, for each of the fragments, the rendering unit 13 calculates a color corresponding to the second radiance of the fragment, and projects the fragment such that the fragment has the color, on the rendering screen. Thereby, the rendering unit 13 generates a rendered image.

FIG. 9 is a diagram illustrating an example of operation in the rendering process performed by the rendering unit 13 described in pseudo code. In FIG. 9, the fragments described above as those visible from the viewpoint are each described as a "visible fragment".

In lines 2 to 5 in FIG. 9, the rendering unit 13 calculates the second radiance which is the radiance of the visible fragment in a direction to the viewpoint.

Each second radiance is the sum of (1) and (2) described below.

(1) Radiance of the fragment in a direction to the viewpoint.

(2) A product each obtained by multiplying each radiance J by its reflectance, the radiance J being one of all radiance J incident on the fragment, the reflectance being for the corresponding radiance J incident on the fragment and being reflected to the direction of the viewpoint.

Then, in line 6, the rendering unit 13 renders the fragment by projecting the fragment with a color based on the calculated second radiance at a position in the rendering screen relevant to the viewpoint where the fragment is to be projected. The shape of the rendered fragment rendered by the rendering unit 13 may depend on the shape of divided fragment or may be different from the shape of divided fragment. The rendering unit 13 may render the fragment in an approximated shape in accordance with the image quality, for example, all the fragments uniformly in a square shape.

Then, in a loop of lines 1 to 7, the rendering unit 13 performs the rendering process on each and every one of the visible fragments.

Figure 10:
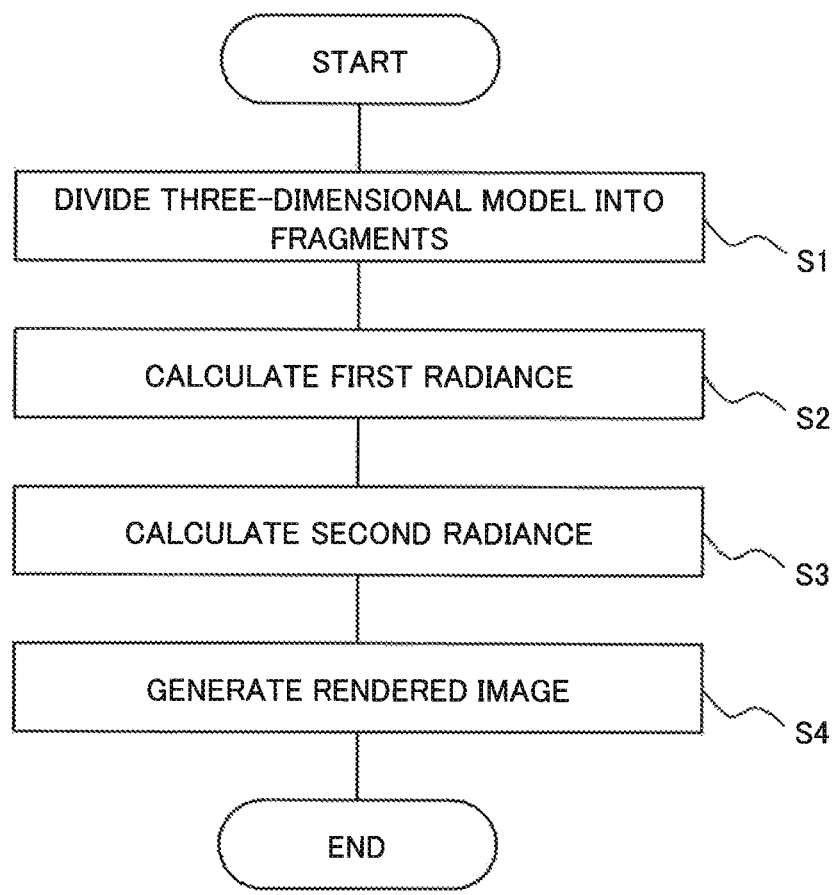
FIG. 10 is a flow chart illustrating an example of a flow of an operation of the rendering apparatus according to the first example embodiment.

Next, with reference to FIG. 10, a flow of the operation of the rendering apparatus 10 according to the present example embodiment will be described. FIG. 10 is a flow chart illustrating an example of a flow of the operation of the rendering apparatus 10 according to the present example embodiment.

As illustrated in FIG. 10, the fragmentation unit 11 divides a three-dimensional model into a plurality of fragments (step S1). Then, the calculation unit 12 calculates the first radiance, which is the radiance in a direction from one fragment to another fragment, for each of the plurality of fragments to every other fragment (step S2).

Then, on the basis of the first radiance, for each fragment visible from the viewpoint among the plurality of fragments, the rendering unit 13 calculates the second radiance, which is the radiance in the direction from the fragment to the viewpoint (step S3). Then, the rendering unit 13 projects the fragments visible having the respective second radiance on a rendering screen relevant to the viewpoint, and generates a rendered image (step S4).

With that step, the rendering apparatus 10 ends the process.

In the technology relevant to NPL2, that is, distributed ray tracing which generates no noise in an image and can handle also reflection other than diffuse reflection, it is required to trace rays generated in a large number of directions at every diffuse reflection, thereby there is a highly possibility that the processing amount increases exponentially. Accordingly, in some cases, the technology relevant to NPL2 cannot generate a rendered image efficiently.

Further, in the technology relevant to NPL3, that is, path tracing which is free from the problem of exponential increase in the processing amount with the number of diffuse reflections and can handle also reflection other than diffuse reflection, one reflection direction is randomly selected for each diffuse reflection. Accordingly, in the technology relevant to NPL3, noises caused by the random selection may distribute throughout the image, thereby noises may appear in a rendered image. Therefore, the technology relevant to NPL3 has a possibility of decrease in the precision of a rendered image.

Further, the technology relevant to NPL1 and Japanese Patent Application Laid-open Publication No. 2010-44738, that is, radiosity which is free from both the problems of exponential increase in the processing amount with the number of diffuse reflections and of noise appearance in an image, is a method in which only diffuse reflection is assumed for simplicity of the processing. Accordingly, radiosity cannot handle transparency, refraction and any reflection other than diffuse reflection such as specular reflection. Therefore, the technology relevant to NPL1 and Japanese Patent Application Laid-open Publication No. 2010-44738 has less versatility.

The rendering apparatus 10 according to the present example embodiment enables efficient generation of a rendered image. It is because the fragmentation unit 11 divides a three-dimensional model considered to consist of an infinite number of continuous points into a finite number of fragments and, for each of the plurality of fragments, the calculation unit 12 calculates the first radiance of light rays from one fragment to respective ones of the other fragments. Accordingly, it becomes possible to reduce the number of first radiance to be calculated by the calculation unit 12 to an amount possible to deal with. As a result, the rendering apparatus 10 can suppress the exponential increase in the amount of rendering processing, and accordingly can perform a rendering process with high speed.

Further, the rendering apparatus 10 according to the present example embodiment enables generation of a highly precise rendered image. It is because the calculation of the first radiance by the calculation unit 12 is performed with a deterministic process, instead of a method like random selection using random numbers, and accordingly, no noise appears in a rendered image rendered by the rendering unit 13.

Furthermore, the rendering apparatus 10 according to the present example embodiment has high versatility. It is because, based on the first radiance calculated by the calculation unit 12, the rendering unit 13 calculates the second radiance in the direction from the fragment to the viewpoint each time the rendered image is rendered. As a result, the rendering apparatus 10 can handle any reflection model, with no limitation to diffuse reflection.

Second Example Embodiment

Next, a second example embodiment of the present invention will be described. In the first example embodiment described above, when a three-dimensional model is input, the processes of fragmentation and of the first radiance calculation are performed regardless of whether there is any change in the shape or the like of the three-dimensional model. In the present example embodiment, a description will be given of another example of a process performed by a rendering apparatus when there is no change in the shape or the like of a three-dimensional model.

Figure 11:
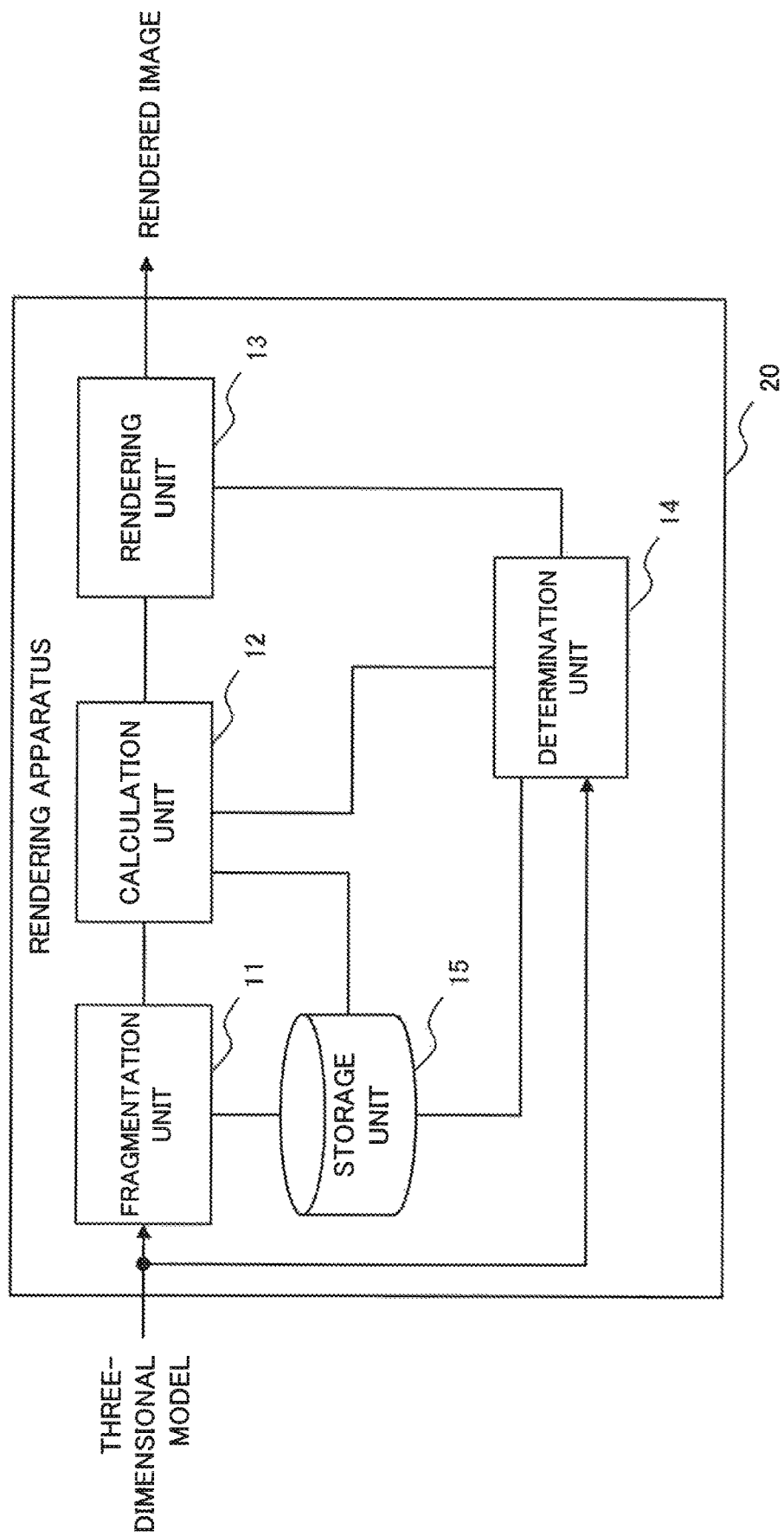
FIG. 11 is a functional block diagram illustrating an example of a functional configuration of a rendering apparatus according to a second example embodiment.

FIG. 11 is a functional block diagram illustrating an example of a functional configuration of a rendering apparatus 20 according to the present example embodiment. Here, for convenience of description, to each component having the same function as that of a component included in the rendering referred to in the first example embodiment, the same sign as that used in the first example embodiment will be assigned, and its description will be omitted.

As illustrated in FIG. 11, the rendering apparatus 20 according to the present example embodiment includes a fragmentation unit 11, a calculation unit 12, a rendering unit 13, a determination unit 14 and a storage unit 15.

The fragmentation unit 11 performs fragmentation of a three-dimensional model, as in the fragmentation unit 11 in the first example embodiment. In the present example embodiment, the fragmentation unit 11 stores three-dimensional model information which is information on the three-dimensional model to be fragmented, into the storage unit 15. The three-dimensional model information may include information expressing a shape of the three-dimensional model, information expressing a position of the three-dimensional model, data on quality of material of the three-dimensional model and the like, but there is no particular restriction on it. Here, the data on quality of material may include a parameter for calculating the reflectance and the like. Further, the fragmentation unit 11 provides the result of fragmentation (referred to as fragmentation information) associated with the three-dimensional model information for the calculation unit 12 and stores the fragmentation information into the storage unit 15. The fragment information may be information including the number of fragments and the size, position, shape and the like of each of the fragments, and may also be the fragment graph described above.

The calculation unit 12 calculates the first radiance, which is radiance in a direction from a fragment to another fragment, for each of the plurality of fragments to every other fragment, as in the calculation unit 12 in the first example embodiment described above. Then, the calculation unit 12 stores the calculated first radiance, for example, those illustrated in FIG. 7 into the storage unit 15, in a manner to correlate them with the three-dimensional model information associated with the fragment information received.

The determination unit 14 receives, as its input, a three-dimensional model similar to that input to the fragmentation unit 11. Then, the determination unit 14 determines whether there is any change in the position and shape of the three-dimensional model input to the determination unit 14. The determination unit 14 further determines whether there is any change in the quality of material of the three-dimensional model. Specifically, the determination unit 14 determines whether the position and shape of the three-dimensional model currently input to the determination unit 14 are the same as or different from those of any one of three-dimensional models represented by respective pieces of three-dimensional model information stored in the storage unit 15 (whether there is any change or not). Then, when there is no change in the position and shape of the current three-dimensional model from those of a previously input three-dimensional model, the determination unit 14 further determines whether or not there is any change in quality of material between the three-dimensional models. Using the data on quality of material included in three-dimensional model information, from among pieces of three-dimensional model information stored in the storage unit 15, on a three-dimensional model having been determined to have the same position and shape as those of the currently input three-dimensional model, the determination unit 14 determines whether there is any change in quality of material between the currently input three-dimensional model and the three-dimensional model represented by the three-dimensional model information.

On the basis of the determination result, the determination unit 14 sends an instruction to the calculation unit 12 or the rendering unit 13. The operation of the determination unit 14 and operation of the calculation unit 12 and rendering unit 13 having received the instruction from the determination unit 14 will be described below, using a flow chart of FIG. 12.

Figure 12:
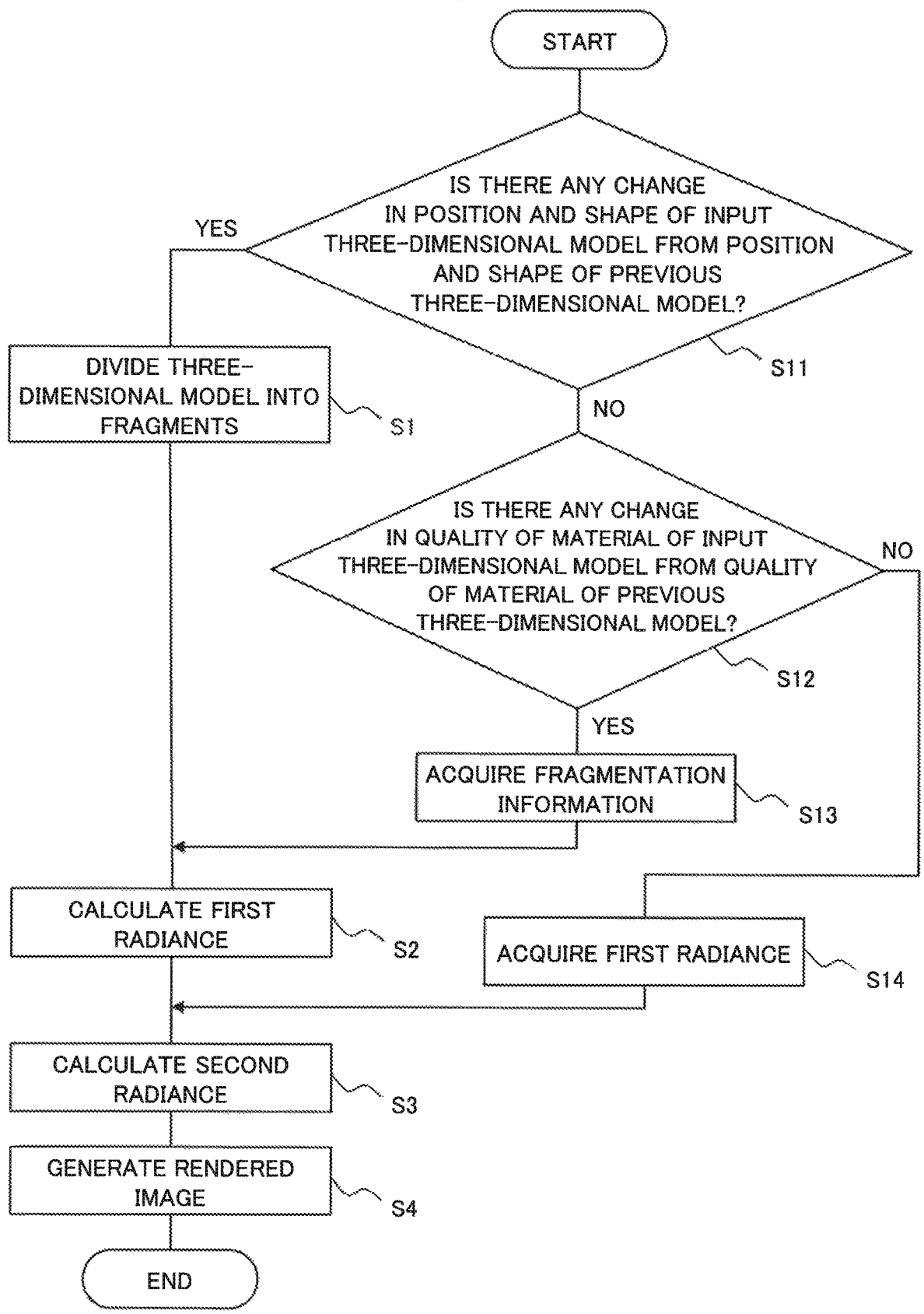
FIG. 12 is a flow chart illustrating an example of a flow of an operation of the rendering apparatus according to the second example embodiment.

FIG. 12 is a flow chart illustrating an example of a flow of the operation of the rendering apparatus 20 according to the present example embodiment. Here, to each process which is the same as that in the flow chart described above using FIG. 10, the same sign as that used in FIG. 10 will be assigned. Hereafter, a three-dimensional model input previously is referred to as a previous three-dimensional model.

As illustrated in FIG. 12, when a three-dimensional model is input to the rendering apparatus 20, the determination unit 14 refers to the storage unit 15 and determines whether there is any change in position and shape of the input three-dimensional model from a previous three-dimensional model which was previously input to the rendering apparatus 20 and the fragmentation process by the fragmentation unit 11 performed on (step S11). When there is any change (YES at the step S11), the determination unit 14 sends an instruction for performing the fragmentation process to the fragmentation unit 11. Upon receipt of the instruction, the fragmentation unit 11 divides the three-dimensional model into a plurality of fragments according to the instruction, as in the first example embodiment described above (step S1). Then, the calculation unit 12 calculates the first radiance (step S2), the rendering unit 13 calculates the second radiance (step S3), and the rendering unit 13 generates a rendered image (step S4).

When there is no change (NO at the step S11), the determination unit 14 further determines whether there is any change in quality of material of the input three-dimensional model from the previous three-dimensional model which is determined to have no change in position and shape (step S12). When there is any change (YES at the step S12), the determination unit 14 sends, to the calculation unit 12, a calculation instruction for calculating the first radiance using a fragmentation result associated with the three-dimensional model information on the previous three-dimensional model, which is stored in the storage unit 15. Then, upon receipt of the calculation instruction, the calculation unit 12 acquires, from the storage unit 15, the fragmentation result to use for calculating the first radiance, according to the received calculation instruction (step S13). Then, using the acquired fragmentation result, the calculation unit 12 calculates the first radiance (step S2). Subsequently, the rendering unit 13 executes the steps S3 and S4.

That is, when the currently input three-dimensional model has no change in position and shape from the previous three-dimensional model, the rendering apparatus 20 can skip the process to be performed by the fragmentation unit 11. As a result, the rendering apparatus 20 according to the present example embodiment can reduce the processing amount required for the fragmentation process.

When there is no change in quality of material from the previous three-dimensional model (NO at the step S12), the determination unit 14 sends, to the rendering unit 13, a calculation instruction for calculating the second radiance using the first radiance associated with the three-dimensional model information on the previous three-dimensional model, which is stored in the storage unit 15. Then, upon receipt of the calculation instruction, the rendering unit 13 acquires, from the storage unit 15, the first radiance to use for calculating the second radiance, according to the received calculation instruction (step S14). Then, on the basis of the acquired first radiance, the rendering unit 13 calculates the second radiance (step S3), and generates a rendered image (step S4).

That is, when the currently input three-dimensional model has no change in position, shape and quality of material from the previous three-dimensional model, the rendering apparatus 20 can skip the processes to be performed respectively by the fragmentation unit 11 and the calculation unit 12. As a result, the rendering apparatus 20 according to the present example embodiment can reduce the processing amount required for the fragmentation process and that for the first radiance calculation process.

(About Hardware Configuration)

In each of the example embodiments of the present disclosure described above, the components of the rendering apparatus represent respective blocks in terms of functions. Part or the whole of the components of the rendering apparatus can be implemented by, for example, a combination of an information processing device 900 and a program, such as shown in FIG. 13. FIG. 13 is a block diagram illustrating an example of a hardware configuration of an information processing device 900 for implementing the components of the rendering apparatus. The information processing device 900 includes the following constituent elements, for example.

Central Processing Unit (CPU) 901
Read Only Memory (ROM) 902
Random Access Memory (RAM) 903
Program 904 loaded in the RAM 903
Storage device 905 storing the program 904
Drive device 907 performing read and write of a recording medium 906
Communication interface 908 connecting with a communication network 909
Input/output interface 910 for performing data input and output
Bus 911 connecting between the components The components of the rendering apparatus in each of the example embodiments are implemented by the CPU 901 acquiring and executing the program 904 for realizing the corresponding functions. The program 904 for realizing the functions of the respective components of the rendering apparatus is, for example, stored in advance in the storage device 905 or the RAM 903 and read by the CPU 901 as necessary. Here, the program 904 may be provided for the CPU 901 via the communication network 909, or may be stored in advance in the recording medium 906 and read and supplied to the CPU 901 by the drive system 907.

There may be a variety of modified examples of the method for implementing the rendering apparatus. For example, the rendering apparatus may be implemented such that each of the components is separately implemented by an optional combination of an information processing device 900 and a program. Further, a plurality of ones of the components included in the rendering apparatus may be implemented by an optional combination of one information processing device 900 and a program.

Furthermore, part or the whole of the components of the rendering apparatus may be implemented by other general-purpose or dedicated circuits, processors and the like, or by their combination. They may be constructed by a single chip or by a plurality of chips connected with each other via a bus.

Part or the whole of the components of the rendering apparatus may be implemented by a combination of the above-described circuits and the like and a program.

When part or the whole of the components of the rendering apparatus is implemented by a plurality of information processing devices, circuits and the like, they may be arranged in either a concentrated or a distributed manner.

For example, the information processing devices, circuits and the like may be implemented in a form where they are connected with each other via a communication network, such as a client and server system, a cloud computing system or the like.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

As has been described above, the rendering apparatuses 10 and 20 can be suitably applied to a global illumination graphics rendering apparatus.

The invention claimed is:

1. A rendering apparatus comprising:
    a memory storing a computer program; and
    at least one processor configured to run the computer program to:
        divide a three-dimensional model into a plurality of fragments;
        generate a directed graph with each of the plurality of fragments as vertex and radiance in the direction from each of the plurality of fragments to every other of the plurality of fragments as edge, each vertex includes three-dimensional coordinates where each of the plurality of fragments is located;
        calculate first radiance for each of the plurality of fragments based on the directed graph, the first radiance being radiance in a direction from a fragment to other fragment, the first radiance being a sum of the radiance in a direction from the fragment to the other fragment and a value multiplied each of the radiance incident on the fragment by a reflectance in the direction of the other fragment; and
        calculate second radiance for each fragment visible from a viewpoint among the plurality of fragments based on the first radiance, the second radiance being radiance in a direction from the fragment to the viewpoint, project each fragment visible having the second radiance on a rendering screen relevant to the viewpoint, and generate a rendered image.

2. The rendering apparatus according to claim 1, wherein the processor is further configured to run the computer program to:
    determine whether there is any change in position and shape of the three-dimensional model, and
    calculate, when the program determines that there is no change in the position and shape, the first radiance using the plurality of fragments into which the three-dimensional model was previously divided.

3. The rendering apparatus according to claim 2,
    wherein the program determines whether there is any change in quality of material of the three-dimensional model; and
    wherein the program calculates, when the program determines that there is no change in the position, shape and quality of material, the second radiance based on the first radiance previously calculated on the three-dimensional model.

4. The rendering apparatus according to claim 1,
    wherein the program divides the three-dimensional model into a plurality of fragments each having a size in accordance with quality of the rendered image.

5. The rendering apparatus according to claim 1, wherein the processor is further configured to run the computer program to:
calculate the second radiance based on the radiance in a direction from the fragment to the viewpoint and a value multiplied each of the radiance incident on the fragment by a reflectance, the reflectance being for the radiance incident on each of the fragment and being reflected to the direction of the viewpoint.

6. A rendering method comprising:
dividing a three-dimensional model into a plurality of fragments;
generating a directed graph with each of the plurality of fragments as vertex and radiance in the direction from each of the plurality of fragments to every other of the plurality of fragments as edge, each vertex including three-dimensional coordinates where each of the plurality of fragments is located;
calculating first radiance for each of the plurality of fragments based on the directed graph, the first radiance being radiance in a direction from a fragment to other fragment, the first radiance being a sum of the radiance in a direction from the fragment to the other fragment and a value multiplied each of the radiance incident on the fragment by a reflectance in the direction of the other fragment; and
calculating second radiance for each fragment visible from a viewpoint among the plurality of fragments based on the first radiance, the second radiance being radiance in a direction from the fragment to the viewpoint, projecting each fragment visible having the second radiance on a rendering screen relevant to the viewpoint, and generating a rendered image.

7. The rendering method according to claim 6, further comprising:
determining whether there is any change in position and shape of the three-dimensional model,
wherein the first radiance is calculated, when determined that there is no change in the position and shape, using a plurality of fragments into which the three-dimensional model was divided previously.

8. The rendering method according to claim 7,
wherein the determining whether there is any change in position and shape includes determining whether there is any change in quality of material of the three-dimensional model,
wherein the second radiance is calculated, when determined that there is no change in the position, shape and quality of material, based on the first radiance previously calculated on the three-dimensional model.

9. The rendering method according to claim 6,
wherein the three-dimensional model is divided into a plurality of fragments each having a size in accordance with quality of the rendered image.

10. A computer readable non-transitory recording medium storing a program for causing a computer to execute:
a fragmentation process of dividing a three-dimensional model into a plurality of fragments;
a generating process of generating a directed graph with each of the plurality of fragments as vertex and radiance in the direction from each of the plurality of fragments to every other of the plurality of fragments as edge, each vertex including three-dimensional coordinates where each of the plurality of fragments is located;
a calculation process of calculating first radiance for each of the plurality of fragments based on the directed graph, the first radiance being radiance in a direction from a fragment to other fragment, the first radiance being a sum of the radiance in a direction from the fragment to the other fragment and a value multiplied each of the radiance incident on the fragment by a reflectance in the direction of the other fragment; and
a rendering process of calculating second radiance for each fragment visible from a viewpoint among the plurality of fragments based on the first radiance, the second radiance being radiance in a direction from the fragment to viewpoint, projecting each fragment visible having the second radiance on a rendering screen relevant the viewpoint, and generating a rendered image.

11. The non-transitory recording medium according to claim 10,
wherein the program further causes the computer to execute:
a determination process of determining whether there is any change in position and shape of the three-dimensional model, and
wherein the calculation process calculates the first radiance, when determined that there is no change in the position and shape, using the plurality of fragments into which the three-dimensional model was previously divided in the fragmentation process.

12. The non-transitory recording medium according to claim 11,
wherein the determination process determines whether there is any change in quality of material of the three-dimensional model, and
wherein the rendering process calculates, when determined that there is no change in the position, shape and quality of material, the second radiance based on the first radiance previously calculated on the three-dimensional model in the calculation process.

13. The non-transitory recording medium according to claim 10,
wherein the fragmentation process divides the three-dimensional model into a plurality of fragments each having a size in accordance with quality of the rendered image.

* * * * *